United States Patent
Fujita

(10) Patent No.: US 12,229,315 B2
(45) Date of Patent: Feb. 18, 2025

(54) MACHINE LEARNING MODEL GENERATING SYSTEM WITH ENHANCED PRIVACY PROTECTION, MACHINE LEARNING MODEL GENERATING METHOD WITH ENHANCED PRIVACY PROTECTION

(71) Applicant: TOYOTA JIDOSHA KABUSHIKI KAISHA, Toyota (JP)

(72) Inventor: Yukihisa Fujita, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 324 days.

(21) Appl. No.: 17/813,734

(22) Filed: Jul. 20, 2022

(65) Prior Publication Data

US 2023/0029851 A1    Feb. 2, 2023

(30) Foreign Application Priority Data

Jul. 27, 2021 (JP) ................................ 2021-122700

(51) Int. Cl.
G06F 21/62     (2013.01)
G06F 18/2415   (2023.01)
H04L 9/40      (2022.01)

(52) U.S. Cl.
CPC ...... *G06F 21/6254* (2013.01); *G06F 18/2415* (2023.01)

(58) Field of Classification Search
CPC ........................ G06F 21/6254; G06F 18/2415
USPC .......................................................... 726/26
See application file for complete search history.

(56) References Cited

U.S. PATENT DOCUMENTS

| | | | |
|---|---|---|---|
| 2015/0339572 A1 | 11/2015 | Achin et al. | |
| 2019/0050683 A1* | 2/2019 | Gupta Hyde | ...... G06V 10/7747 |
| 2019/0156060 A1 | 5/2019 | Maier et al. | |
| 2020/0364604 A1 | 11/2020 | Eberlein et al. | |
| 2022/0179978 A1* | 6/2022 | Stroila | ..................... G06N 5/04 |
| 2022/0306088 A1* | 9/2022 | Rahimpour | ....... B60W 30/0956 |

FOREIGN PATENT DOCUMENTS

| | | |
|---|---|---|
| CN | 113 051 620 A | 6/2021 |
| JP | 2018097467 A | 6/2018 |
| JP | 2019040543 A | 3/2019 |
| JP | 2019-211899 A | 12/2019 |
| JP | 2020035066 A | 3/2020 |
| JP | 2020187723 A | 11/2020 |

(Continued)

*Primary Examiner* — Haresh N Patel
(74) *Attorney, Agent, or Firm* — Dickinson Wright, PLLC

(57) ABSTRACT

A system comprises a memory and a processing apparatus. The memory stores a collection of personal information data and a data catalog of the collection of personal information data. The processing apparatus executes generating the machine learning model according to a designated machine learning logic, based on personal information data, corresponding to designated metadata in the data catalog and a designated data range. And the processing apparatus, executes calculating a personal identification risk which shows a risk of a person being identified based on an output of the machine learning model. Then the processing apparatus executes outputting the machine learning model when the personal identification risk, does not exceed a predetermined threshold.

4 Claims, 11 Drawing Sheets

(56) References Cited

FOREIGN PATENT DOCUMENTS

| JP | 2021-012734 A | | 2/2021 |
|----|---------------|---|--------|
| JP | 2021-503648 A | | 2/2021 |
| JP | 2022171390 A | * | 11/2022 |
| WO | 2020/148573 A1 | | 7/2020 |

* cited by examiner

| PERSONAL ATTRIBUTE | | | | | |
|---|---|---|---|---|---|
| time point | sex | age | address | income | ID information |
| 2020/10/01 | Male | 32 | XXX | 700 | jfda093jt |
| 2020/10/01 | Female | 26 | YYY | 500 | gq409jf32 |

| PURCHASE INFORMATION | | | | | |
|---|---|---|---|---|---|
| time point | store | product | number of purchase | price | ID information |
| 2020/10/02 | S1 | soft drink | 1 | 150 | jfda093jt |
| 2020/10/03 | S2 | candy | 2 | 300 | gq409jf32 |

| SURVEILLANCE VIDEO DATA | | | | | |
|---|---|---|---|---|---|
| time point | video file | shooting period | shooting camera | shooting location | ID information |
| 2020/11/07 | XX.zzz | 2020/11/05 -2020/11/06 | C1 | XXX | jfda093jt gq409jf32 |
| 2020/11/08 | YY.zzz | 2020/11/06 -2020/11/07 | C2 | YYY | 65k262f |

| INPUT DATA | | | | | OUTPUT DATA |
|---|---|---|---|---|---|
| item #1 | item #2 | item #3 | item #4 | ID information | |
| 0 | 0.3 | 0.87 | 0.31 | jfda093jt | 4 |
| 1 | 0.1 | 0.32 | 0.76 | gq409jf32 | 5 |
| 1 | 0.6 | 0.13 | 0.22 | 65k262f | 5 |
| 0 | 0.9 | 0.56 | 0.45 | jfda093jt | 4 |
| 0 | 1.0 | 0.55 | 0.80 | gq409jf32 | 3 |
| 1 | 1.1 | 0.33 | 0.12 | 65k262f | 8 |
| 0 | 0.3 | 0.91 | 0.64 | jfda093jt gq409jf32 | 4 |
| 1 | 0.2 | 0.24 | 0.55 | jfda093jt 65k262f | 3 |
| 0 | 0.7 | 0.58 | 0.51 | gq409jf32 65k262f | 2 |

*FIG. 8A*

| CORRESPONDENCE INFORMATION | |
|---|---|
| ID information | corresponded output data |
| jfda093jt | {4, 4, 4, 3} |
| gq409jf32 | {5, 3, 4, 2} |
| 65k262f | {5, 8, 3, 2} |

*FIG. 8B*

| u(i, j) | | | |
|---|---|---|---|
| j \ i | jfda093jt | gq409jf32 | 65k262f |
| 2 | 0 | 1 | 1 |
| 3 | 1 | 1 | 1 |
| 4 | 3 | 1 | 0 |
| 5 | 0 | 1 | 1 |
| 8 | 0 | 0 | 1 |

FIG. 9

| u(i, j) | | | | |
|---|---|---|---|---|
| j \ i | ID #1 | ID #2 | ID #3 | ID #4 |
| category #1 | 3 | 0 | 0 | 5 |
| category #2 | 2 | 3 | 1 | 10 |
| category #3 | 0 | 0 | 4 | 0 |
| category #4 | 4 | 0 | 0 | 0 |

FIG. 10A

| r(i, j) | | | | |
|---|---|---|---|---|
| j \ i | ID #1 | ID #2 | ID #3 | ID #4 |
| category #1 | 3/14 | 0 | 0 | 5/18 |
| category #2 | 2/23 | 3/16 | 1/20 | 10/21 |
| category #3 | 0 | 0 | 4/5 | 0 |
| category #4 | 4/10 | 0 | 0 | 0 |

FIG. 10B

MACHINE LEARNING MODEL GENERATING SYSTEM WITH ENHANCED PRIVACY PROTECTION, MACHINE LEARNING MODEL GENERATING METHOD WITH ENHANCED PRIVACY PROTECTION

CROSS-REFERENCE TO RELATED APPLICATION

The present disclosure claims priority under 35 U.S.C. § 119 to Japanese Patent. Application No. 2021-122700, filed on Jul. 27, 2021, which is incorporated herein by reference in its entirety.

BACKGROUND

Technical Field

The present disclosure relates to a system generating a machine learning model. The present disclosure also relates to a method generating a machine learning model.

Background Art

Patent Literature 1 discloses a privacy protection data providing system for obtaining an anonymous model by performing anonymization processing on a deep learning model obtained by applying a deep learning algorithm. The privacy protection data providing system is configured to execute calculating errors of weight parameters and bias parameters included in the deep learning model, based on Laplace distribution. And the privacy protection data providing system is also configured to execute limiting a range of threshold shown by maximum and minimum values when each parameter calculated errors based on Laplace distribution exceeds the range of threshold.

LIST OF RELATED ART

Patent Literature 1: Japanese Laid-Open Patent Application Publication No. JP-2018-97467

SUMMARY

As the technology of machine learning develops and the utilization of various types of data is advancing, the usefulness of personal information data is drawing attention. Also, in the future, as the number of cases that a person collecting data and a user are different such as in Smart City is expected to, increase, the demand for the user to use the personal information data collected by other people is expected to increase. However, because there is risk of leaks of the personal information data and difficulty providing it to third parties from the perspective of the privacy protection, the personal information data is limited to use within a limited organization and use of statistical information. In this way, the use of the personal information data in machine learning has not progressed in the past.

The privacy protection data providing system disclosed in Patent Document 1 is configured to execute generating the anonymous model (machine, learning model) to which the anonymization processing has been performed. However, since the generated machine learning model is not judged in accordance with the privacy protection there is a possibility that a machine learning model in which the privacy protection is insufficient may be provided.

An object of the present disclosure is, in view of the above problems, to provide a system and a method capable of generating a machine learning model using personal information data without disclosing the personal information data to a user, while preventing the provision of the machine learning model in which the privacy protection is insufficient.

A first disclosure is directed to a system generating a machine learning model.

The system comprises:

a memory that storing a collection, of personal information data and a data catalog of the collection of personal information data; and a processing apparatus.

The processing apparatus is configured to execute:

acquiring designation of metadata in the data catalog;

acquiring a first data range determining a part of the collection of personal information data;

acquiring a machine learning logic;

generating the machine learning model according to the machine learning logic, based on personal information data corresponding to designated metadata and the first, data range;

calculating a personal identification risk which shows a risk of a person being identified based on an output of the machine learning model; and outputting the machine learning model when the personal identification risk does not exceed a predetermined threshold.

A second disclosure is directed to a system further including the following features with respect to the system according to the first disclosure.

Each of the collection of personal information data is corresponding to one or more pieces of ID information each of which shows a particular individual.

The calculating the personal identification risk includes:

selecting input data from the collection of personal information data;

acquiring output data of the machine learning model by inputting the input data;

generating correspondence information which shows correspondence between the one or more pieces of ID information corresponded to the input data and the output data for the input data; and calculating the personal identification risk based on the correspondence information.

A third disclosure is directed to a system further including the following features with respect to the system according to the second disclosure.

The calculating the personal identification risk further includes:

classifying the output data into categories;

calculating, for each of combinations of the one or more pieces of ID information and the categories, number of the output data which falls into a category specified by a combination and corresponds in the correspondence information to ID information specified by the combination; and calculating the personal identification risk according to the following formula:

$$r(i, j) = \frac{u(i, j)}{\sum_k u(i, k) + \sum_k u(k, j) - u(i, j)}$$

$$IR = \max_{(i,j)}(r(i, j))$$

where:

IR is the personal identification risk, (i, j) is one of the combinations, and u(i, j) is the number of the output data calculated regarding (i, j).

A fourth disclosure is directed to a system further including the following features with respect to the system according to the third disclosure.

The selecting the input data includes:
generating a second data range determining a part of the collection of personal information data; and
selecting personal information data corresponding to the second data range as the input data.

A fifth disclosure is directed to a system, further including the following features with respect to the system according to the fourth disclosure.
the second data range comprises a plurality of data ranges each of which is generated in different scale.

A sixth disclosure is directed to a method generating a machine learning model.

The method comprises:
storing a collection of personal information data and a data catalog of the collection of personal information data into a memory; and
causing a processing apparatus to execute:
acquiring designation of metadata in the data, catalog;
acquiring a first data range determining a part of the collection of personal information data;
acquiring a machine learning logic;
generating the machine learning model according to the machine learning logic, based on personal information data corresponding to designated metadata and the first data range;
calculating a personal identification risk which shows a risk of a person being identified based on an output of the machine learning model; and
outputting the machine learning model when the personal identification risk does not exceed a predetermined threshold, and not outputting the machine learning model when the personal identification risk exceeds the predetermined threshold.

A seventh disclosure is directed to a system further including the following features with respect to the system according to the sixth disclosure.

Each of the collection of personal information data is corresponding to one or more pieces of ID information each of which shows a particular individual.
The calculating the personal identification risk includes:
selecting input data from the collection of personal information data;
acquiring output data of the machine learning model by inputting the input data;
generating correspondence information which shows correspondence between the one or more pieces of ID information corresponded to the input data and the output data for the input data; and
calculating the personal identification risk based on the correspondence information.

An eighth disclosure is directed to a system further including the following features with respect to the system according to the seventh disclosure.

The calculating the personal identification risk further includes:
classifying the output data into categories;
calculating, for each of combinations of the one or more pieces of ID information and the categories, number of the output data which falls into a category specified by a combination and corresponds in the correspondence information to ID information specified by the combination; and
calculating the personal identification risk according to the following formula:

$$r(i, j) = \frac{u(i, j)}{\sum_k u(i, k) + \sum_k u(k, j) - u(i, j)}$$

$$IR = \max_{(i,j)}(r(i, j))$$

where:

IR is the personal identification risk, (i, j) is one of the combinations and u(i, j) is the number of the output data calculated regarding (i, j).

According to the present disclosure, a machine learning model using personal information data is generated. And, when the personal identification risk exceeds the predetermined threshold, the generated machine learning model is not outputted. It is thus possible to suppress providing a machine learning model where the output could identify an individual and privacy protection is insufficient. Consequently, it is possible to, reduce the risk, of leaks of personal information data.

In, addition, personal information data corresponding to the designated metadata and the first data range is used to generate the machine learning model. Thus, the personal information data is not disclosed to a user. Consequently it is possible to provide a machine learning model generated by directly using personal information data, not statistical information.

BRIEF DESCRIPTION OF THE DRAWINGS

FIG. 3A is a diagram showing an example of a collection of personal information data stored in a memory.

FIG. 3B is a diagram showing an example of the collection of personal information data stored in the memory.

FIG. 3C is a diagram showing an example of the collection of personal information data stored in the memory.

FIG. 8A is a diagram showing an example of input data and output data of the input data.

FIG. 8B is a diagram showing an example of a correspondence information generated for the output data shown in FIG. 8A.

FIG. 9 is a diagram showing number of output data calculated for each of combinations of one or more pieces of ID information and categories.

FIG. 10A is a diagram for explaining processing to calculate a personal identification risk.

FIG. 10B is a diagram for explaining processing to calculate the personal identification risk.

EMBODIMENTS

Figure 1:
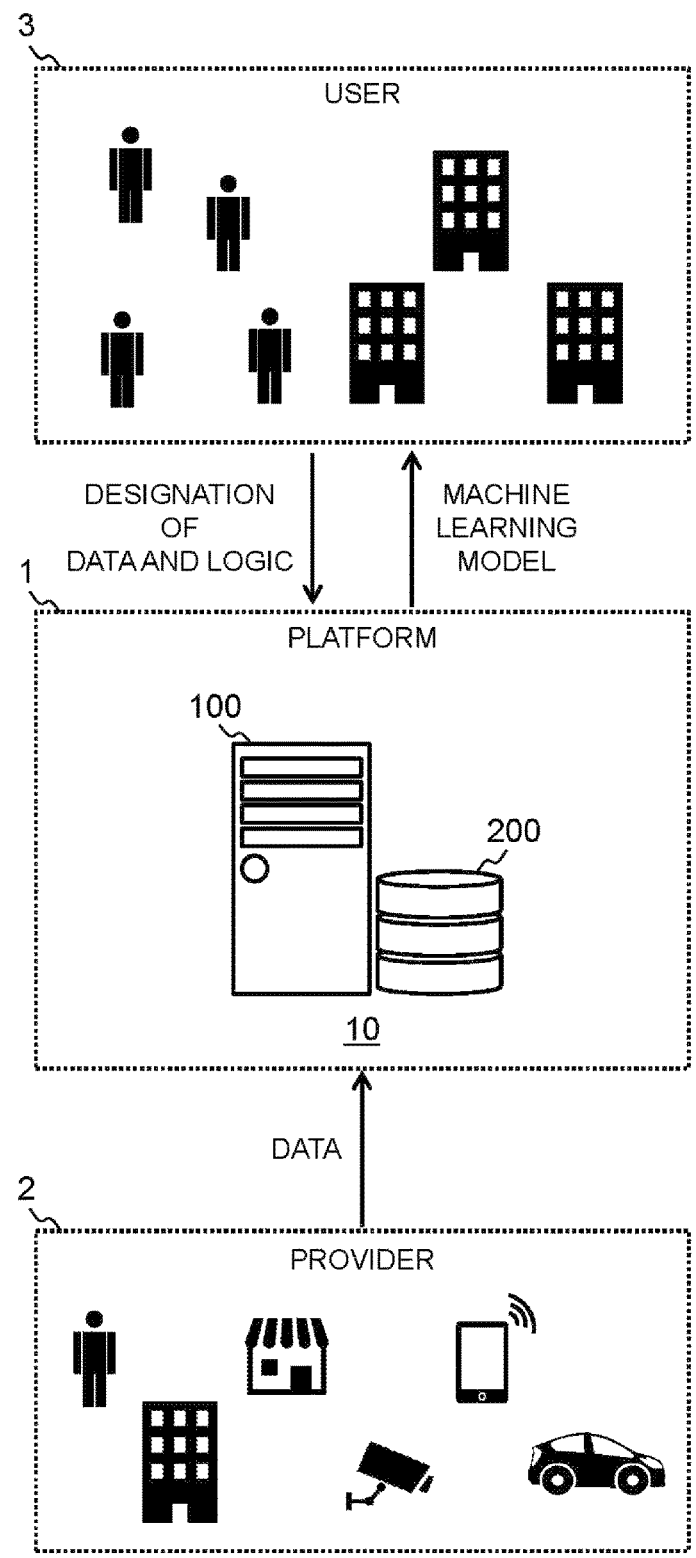
FIG. 1 is a conceptual diagram for explaining an outline of a platform realized by a machine learning model generating system according to an embodiment of the present disclosure.

Hereinafter, embodiments of the present disclosure will be described with reference to the accompanying drawings. Note that when the numerals of numbers, quantities, amounts, ranges, and the like of respective elements are mentioned in the embodiment shown as follows, the present disclosure is not limited to the mentioned numerals unless specially explicitly described otherwise, or unless the disclosure is explicitly specified by the numerals theoretically. Furthermore, configurations that are described in the embodiment shown as follows are not always indispensable to the disclosure unless specially explicitly shown otherwise, or unless the disclosure is explicitly specified by the structures or the steps theoretically. In addition, in the drawings, the same reference sign or numeral will be given to the same or equivalent component, and the repetitive description thereof will be appropriately simplified or omitted.

1. Outline

A machine learning model generating system according to the present embodiment realizes a platform that provides a machine learning model to a user at a request of the user. FIG. 1 is a conceptual diagram for explaining an outline of the platform 1 realized by the machine learning model generating, system 10.

On the platform 1, data is collected and provided by a provider 2. Here the data, may contain personal information data. A user 3 designates data to be used and a logic of machine learning (machine learning logic), then the user 3 is provided with a machine learning model. Here, the provided machine learning model is generated according to the designated machine learning logic, based on the designated data.

The provider 2 shows an entity collecting and providing the data, so the provider 2 is not limited to people. Examples of the provider 2 include people, companies, retailers, surveillance cameras, user devices, cars, and the like. Examples of the personal information data collected and provided by the provider 2 include personal attributes (e.g., age, height, weight), customer data, purchase information (e.g., purchased items, purchase date), surveillance video data, usage information of the user devices, moving data, and the like. Other examples of the personal information data include location information, behavioral information, media information, and physical information.

The providing and collecting the data by the provider 2 may be performed actively or automatically. For example, it may be actively performed by the operation of a certain device, or it may be automatically performed continuously or at predetermined intervals by communication through the Internet or a cable.

The platform 1 is realized by the machine learning, model generating system 10. The machine learning model generating system 10 comprises a processing apparatus 100 and a memory 200.

The processing apparatus 100 connects to the memory 200 and is configured to execute processing of machine learning based on data, stored in the memory 200. Then, the processing apparatus 100 outputs a machine learning model generated by executing the processing of machine learning. But the processing apparatus 100 executes the processing according to the machine learning logic designated by the user 3, based on the data designated by the user 3.

The processing apparatus 100 is, for example, a server configured on the Internet. In this case, the user 3, through the communication on the internet, may designate the data to be used and the machine learning logic, and may be provided with the machine learning model. Typically, the user 3, in, a certain application or browser, designates the data to be used and the machine learning logic, and is provided with the machine learning model.

The processing apparatus 100 may be a dedicated device or a personal computer. In this case, the user 3, by operating HMI devices (e.g., touch panel, keyboard, display) connected to the dedicated device or the personal computer, designates the data to be used and the machine learning logic, and is provided with the machine learning model.

The processing apparatus 100 may be a system composed of a plurality of computers. For example, the processing apparatus 100 may be a plurality of servers configured to execute processing in cooperation with each other.

The memory 200 stores the data provided by the provider 2. The memory 200 is, for example, a data, server configured on the Internet. In this case, the memory 200 acquires the data from the provider 2 by communication on the internet, and stores the data.

The processing apparatus 100 and the memory 200 are connected so that they can communicate information with each other. For example, the processing apparatus 100 and the memory 200 are connected on the Internet. Alternatively, the processing apparatus 100 and the memory 200 may be connected electronically or optically by cables. Alternatively, the processing apparatus 100 and the memory 200 may comprises wireless devices, and may communicate information with each other by wireless communication.

The processing apparatus 100 and the memory 200 may be configured integrally. For example, the memory 200 may be a secondary storage of the processing apparatus 100.

On the platform 1 realized by the machine learning model generating system 10 as described above, from the perspective of privacy protection, it is required that the personal information data is not disclosed to third parties. Furthermore, if an output of the generated machine learning is likely to identify an individual, the generated machine learning model cannot be said to be enough in privacy protection. For example, if a particular output is output frequently when personal information data of a particular individual is input, the particular output may represent the particular individual.

The machine learning model generating system 10 according to the present embodiment is configured to generate a machine learning model using personal information data without disclosing the personal information data to the user 3. Furthermore, the machine learning model generating system 10 according to the present embodiment is configured to calculate a risk (personal identification risk) of a person being identified based on an output of the generated machine learning model. And the machine learning model generating system 10 is configured to stop providing the generated machine learning model when the personal identification risk exceeds a predetermined threshold. The machine learning model generating system 10 and the machine learning model generating method according to the present embodiment will be described below in detail.

2. Machine Learning Model Generating System 2-1. Configuration

Figure 2:
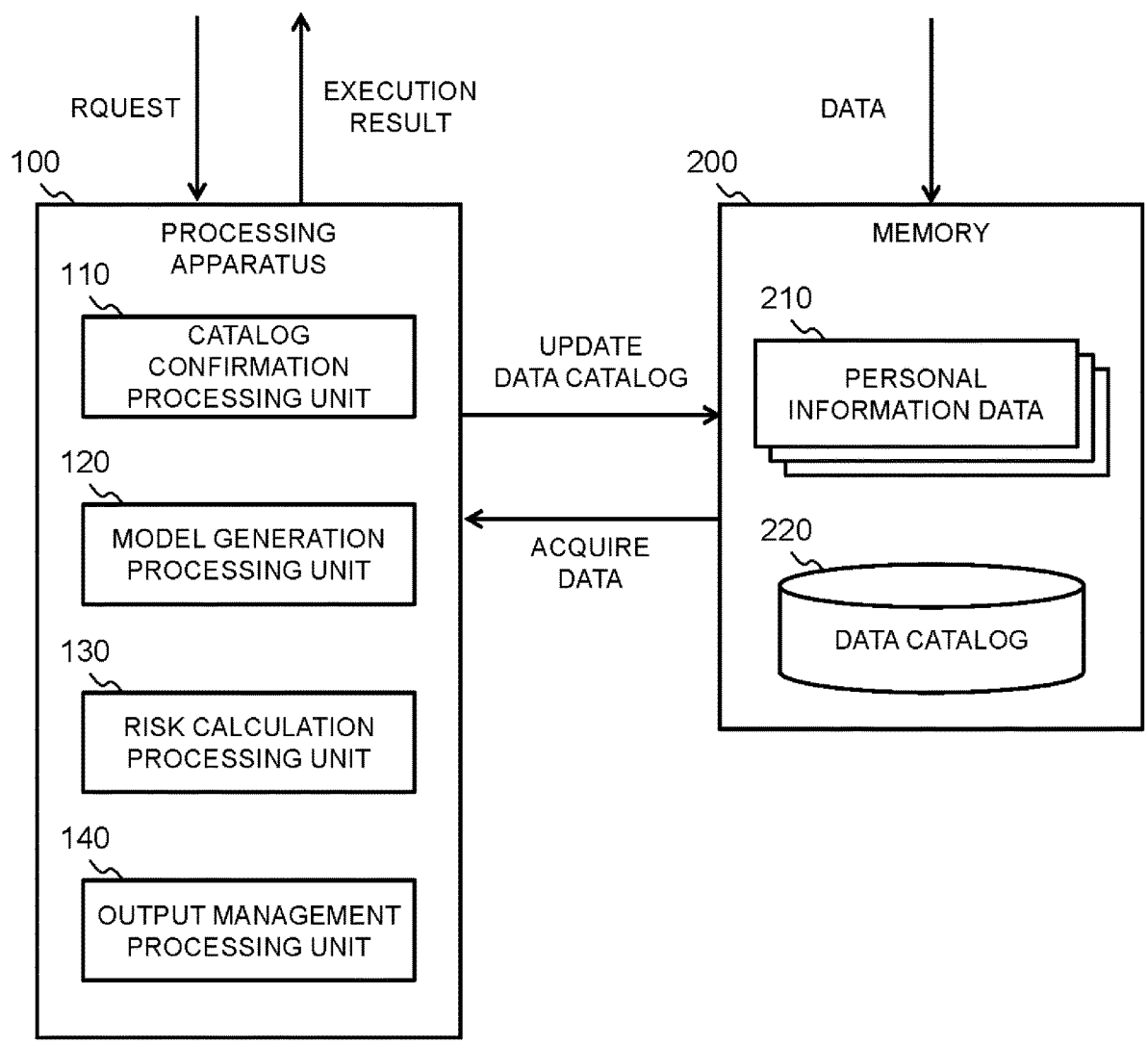
FIG. 2 is a block diagram showing a configuration of the machine learning model generating system according to an embodiment of the present disclosure.

FIG. 2 is a block diagram showing a configuration of the machine learning model generating system 10 according to the present embodiment. The machine learning model generating system 10 comprises the processing apparatus 100 and the memory 200.

The processing apparatus 100 acquires request information and executes processing according to the request information. Then, the processing apparatus 100 outputs an execution result. Here, the request information acquired by the processing apparatus 100 includes request for a data catalog 220 and request for a machine learning model.

The data catalog 220 is stored in the memory 200. The data catalog 220 is a data catalog of a collection of personal information data 210 stored in the memory 200. That is, the data catalog 220 includes metadata of the collection of personal information data 210. Examples of the metadata include a table name (e.g., "personal attribute", "purchase information", "location information", "behavior information", "media", "physical information", a data storage destination (e.g., URL), a data item (e.g., "gender", "age", "address" "item name", "price", "position"), a type of data (e.g., character string, numerical value, time), a data range (e.g., minimum value, maximum value), and the like.

The data catalog 220 is updated by the processing apparatus 100. The processing apparatus 100 acquires data from the memory 200 and extracts the metadata of the collection of personal information data 210. Then, the processing apparatus 100 updates the data catalog 220 based on the extracted metadata.

For example, updating of the data catalog 220 is performed at predetermined intervals. In this case, the processing apparatus 100 acquires an update time point which is a time point then the data catalog 220 is updated, and determines whether or not the data catalog 220 needs to be updated based on the update time point.

The processing apparatus 100 comprises a catalog confirmation processing unit 110, a model generation processing unit 120, a risk calculation processing unit 130, and an output management processing unit 140. These processing units may be realized by a part of a program that describes processing executed by the processing apparatus 100, or may be realized by computers comprised in the processing apparatus 100.

The catalog confirmation processing unit 110 executes processing related to updating and providing the data catalog 220. The model generation processing unit 120, the risk calculation processing unit 130, and the output management processing unit 140 execute processing related to generating and outputting a machine learning model.

When the processing apparatus 100 acquires the request information for the data catalog 220, the processing apparatus 100 outputs the data catalog 220 as the execution result. When the processing apparatus 100 acquires the request information, fora machine learning model, the processing apparatus 100 outputs the machine learning model as the execution result. Details of each processing executed by the processing apparatus 100 will be described later.

Each of the collection of personal information data 210 stored in the memory 200 is corresponding to one or more pieces of ID information each of which shows a particular individual. FIG. 3A, FIG. 3B, and FIG. 3C show an example of the collection of personal information data 210 as a table. FIG. 3A, FIG. 3B, and FIG. 3C show the collection of personal information data regarding personal attributes, purchase information, and surveillance video data respectively. In the table, the first row shows items of personal information data, from the second row onward, each row shows one personal information data.

As shown in FIG. 3A, FIG. 3B, and FIG. 3C, the personal information data is corresponding to one or more pieces of ID information. In the example shown in FIG. 3A, FIG. 3B, and FIG. 3C, the ID information is a string corresponding to a particular individual. The ID information in FIG. 3A shows, for example, an individual having the personal attribute. The ID information in FIG. 3B shows, for example, a purchaser. The ID information in FIG. 3C shows, for example, a person reflected in the surveillance video.

The data of each item may be managed with numerical values. For example, for the item of "sex", Male may be managed by 0 and Female may be managed by 1.

2-2. Providing Data Catalog

Figure 4:
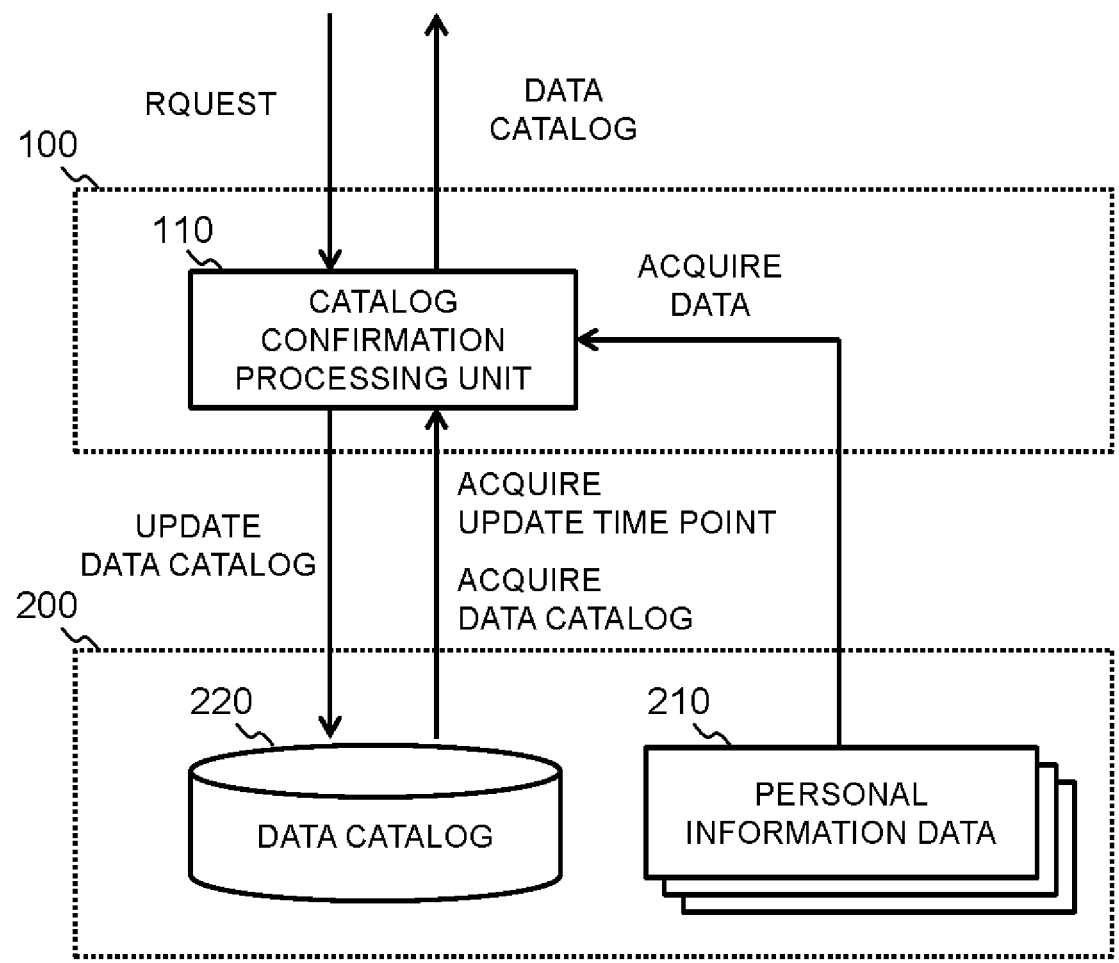
FIG. 4 is a block diagram showing a configuration of processing executed by a processing apparatus when acquiring request information for a data catalog.

The following will describe the processing executed by the processing apparatus 100 when acquiring the request information for the data catalog 220 (hereinafter, also referred to as "data catalog providing process"). FIG. 4 is a block diagram showing a configuration of the data catalog providing process.

When the processing apparatus 100 acquires the request information for the data catalog 220, the catalog confirmation processing unit 110 executes acquiring the update time point and confirming whether or not a predetermined period has elapsed from the update time point. Here, the predetermined period may be suitably defined according to the environment employing the machine learning model generating system 10 and personal information data to be used.

When confirming the predetermined period has elapsed form the update time point, the catalog confirmation processing unit 110 executes updating the data catalog 220. When updating the data catalog 220, the catalog confirmation processing unit 110 executes acquiring the collection of personal information data 210 and extracting the metadata of the collection of personal information data 210. Then, the catalog confirmation processing unit 110 executes updating the data catalog 220 based on the extracted metadata. After that, the catalog confirmation processing unit 110 executes outputting the updated data catalog 220.

On the other hand, when confirming the predetermined period has not elapsed from the update time point, the catalog confirmation processing unit 110 executes acquiring and outputting the data catalog 220 without updating the data catalog 220.

Figure 5:
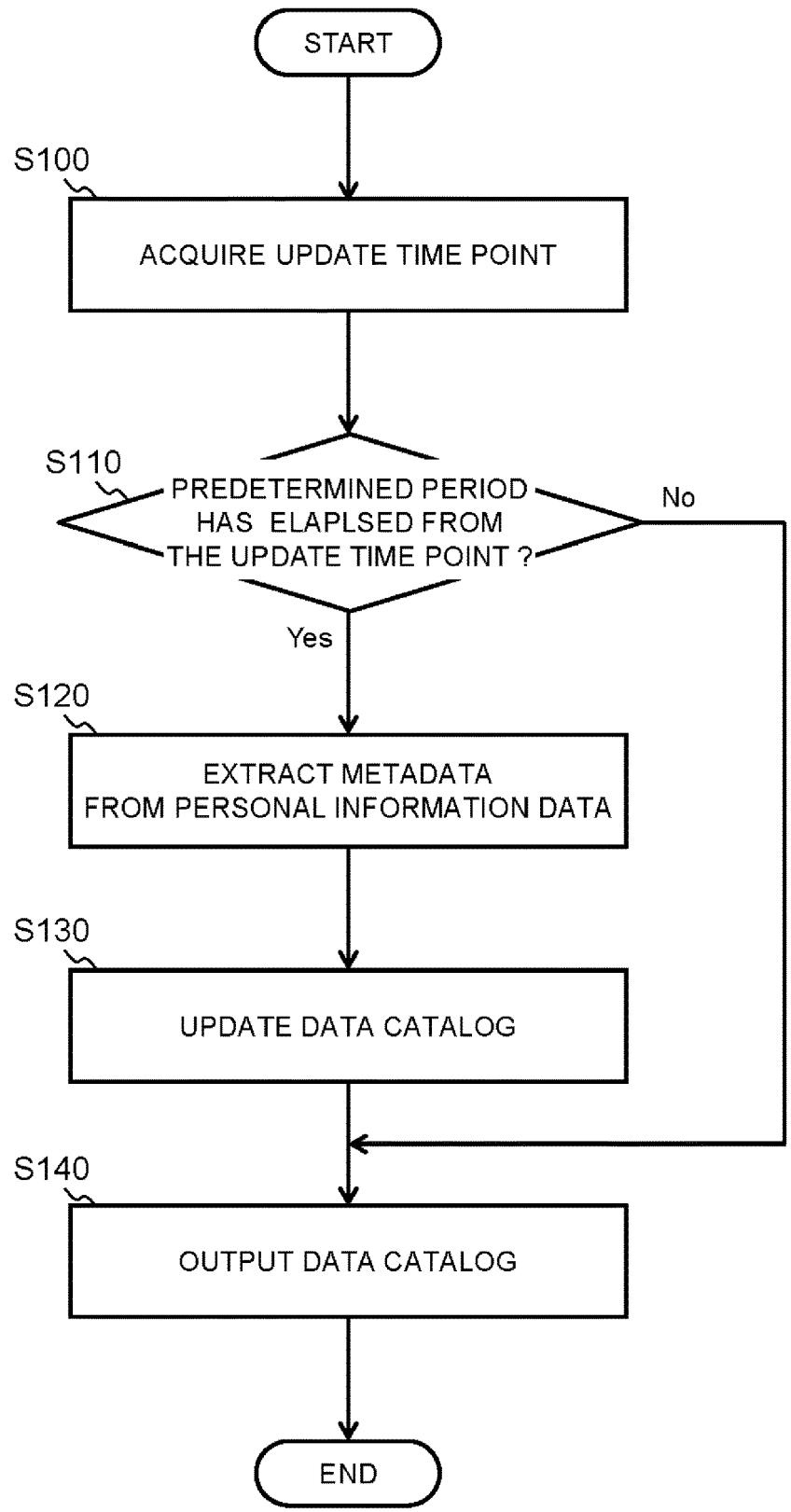
FIG. 5 is a flowchart showing a method providing the data catalog realized by the machine learning model generating system according to an embodiment of the present disclosure.

FIG. 5 is a flowchart showing a method providing the data catalog 220 realized by the machine learning model generating system 10 according to the present embodiment. The flowchart shown in FIG. 5 starts when the processing apparatus 100 acquires the request information for the data catalog 220, and the process is executed at predetermined intervals.

In Step S100, the catalog confirmation processing unit 110 executes acquiring the update time point of the data catalog 220. Then the processing proceeds to Step S110.

In Step S110, the catalog confirmation processing unit 110 executes determining whether or not the predetermined period has elapsed from the update time point acquired in Step S100. When the predetermined period has elapsed from the update time point (Step S110; Yes), the processing proceeds to Step S120. When the predetermined period has not elapsed from the update time point (Step S110; No), the processing proceeds to Step S140.

In Step S120, the catalog confirmation processing unit 110 executes acquiring the collection personal information data 210 and, extracting the metadata of the collection of personal information data 210. Then the processing proceeds to Step S130.

In Step S130, the catalog confirmation processing unit 110 executes updating the data catalog 220 based on the metadata extracted in Step S120. Then the processing to Step S140.

In Step S140, the catalog confirmation processing unit 110 executes acquiring, and outputting the data catalog 220. After Step S140, the processing ends.

As described above, in the data catalog providing process, when the predetermined period has elapsed from the update time point of the data catalog 220, the data catalog is updated. It is thus possible to keep the data catalog in a new state while suppressing the update load of the data catalog 220.

2-3. Providing Machine Learning Model

Figure 6:
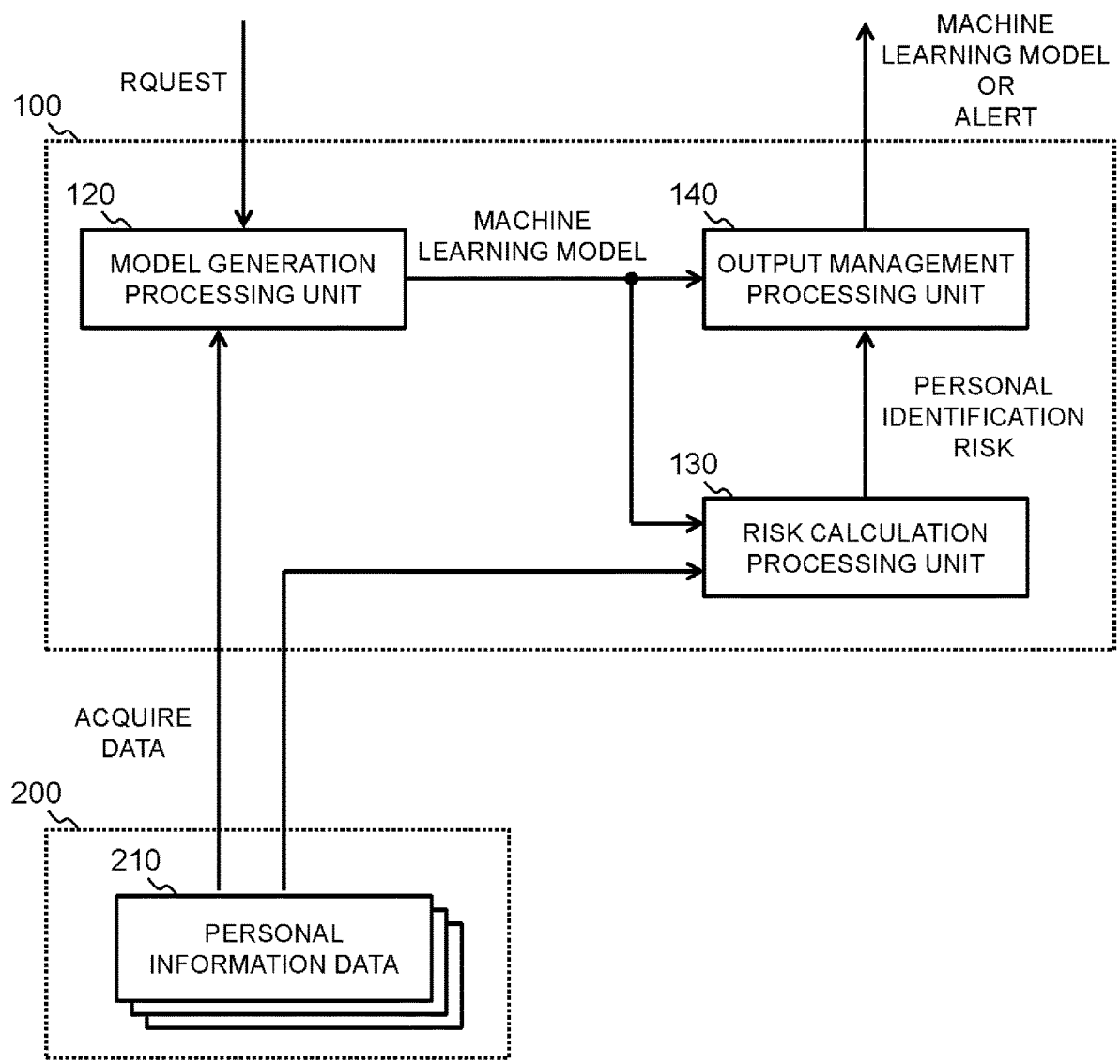
FIG. 6 is a block diagram showing a configuration of processing executed by the accessing apparatus when acquiring request information for provision of a machine learning model.

The following will describe the processing executed by the processing apparatus 100 when acquiring the request information for the machine learning model (hereinafter, also referred to as "machine learning model providing process"). FIG. 6 is a block diagram showing a configuration of the machine learning model providing process.

The request information includes designation of the metadata in the data catalog 220, a data range determining a part of the collection of personal information data 210 (hereinafter also referred to as "first data range"), and a machine learning logic.

Here, the personal information data corresponding to the designated metadata and the first data range are used for generating the machine learning model. That is, the request information does not directly include the data to be used for generating the machine learning model. Consequently, the machine learning model generating system 10 does not disclose the personal information data to the user 3 for generating the machine learning model.

On the other hand, the user3 can designate the metadata and the first data range by referring the data catalog 220.

The designation of the metadata is typically performed by designating data items. The designation of the first data range is typically performed by designating the time period regarding the time when the data is acquired. For example, the user 3 designates "sex" "age" of the personal attributes as the designation of the metadata, and designates the period of 2020/10/01-2020/11/31 as the designation of the first data range. In this case, the personal information data for "gender" and "age" which is acquired in the period of 2020/10/01-2020/11/31 is used for generating the machine learning model.

As other examples, the designation of the metadata may be performed by designating the table name, and the designation of the first data range may be performed by designating an area of location where the data is acquired.

The machine learning logic typically includes a logic for learning and a logic for evaluation. Furthermore, the machine learning logic may include other logics. For example, the machine learning logic may include a logic to convert the data acquired from the memory 200 to training data. The user 3 may designate the machine learning logic by directly entering a source code, or by selecting a library prepared in the machine learning model generating system 10 in advance.

Typically, the content of the output of the machine learning model (e.g., label of image data) is determined by the machine learning logic.

The first data, range may comprise a plurality of data ranges according to the machine learning logic. For example, the first data range may comprise a data range for learning and a data range for validation separately.

The model generation processing unit 120 executes acquiring personal information data corresponding to the metadata and the first data range designated by the request information. The model generation processing unit 120 executes generating a machine learning model according to the machine learning logic designated by the request information, based on the acquired personal information data. The generated machine learning model is transmitted to the risk calculation processing unit 130 and the output management processing unit 140.

The model generation processing unit 120 typically executes processing related to interpretation of the source code, learning, validation, and evaluation. However, when the machine learning logic is selected from the library, the processing related to the interpretation of the source code need not be executed.

The risk calculation processing unit 130 executes calculating the personal identification risk of the machine learning model generated by the model generation processing unit 120. Hereinafter, the processing executed by the risk calculation processing unit 130 is also referred to as "risk calculation process". The risk calculation process includes selecting a part of the collection of personal information data 210 as input data. Then calculating the personal identification risk is performed by verifying output data acquired by inputting the input data to the generated machine learning model. Details of the risk calculation process will be described later. The calculated personal identification risk is transmitted to the output management processing unit 140.

The output management processing unit 140 executes determining whether or not to output the machine learning model generated by model generation processing unit 120, based on the personal identification risk calculated by the risk calculation processing unit 130. The output management processing unit 140 outputs the generated machine learning model when the personal identification risk does not exceed a predetermined threshold, and does not output the generated machine learning model when the personal identification risk exceeds the predetermined threshold. In addition, when not outputting the generated machine learning model, the output management processing unit 140 may output alerts.

The output management processing unit 140 may be configured to execute deleting the generated machine learning model when not outputting the generated machine learning model.

Figure 7:
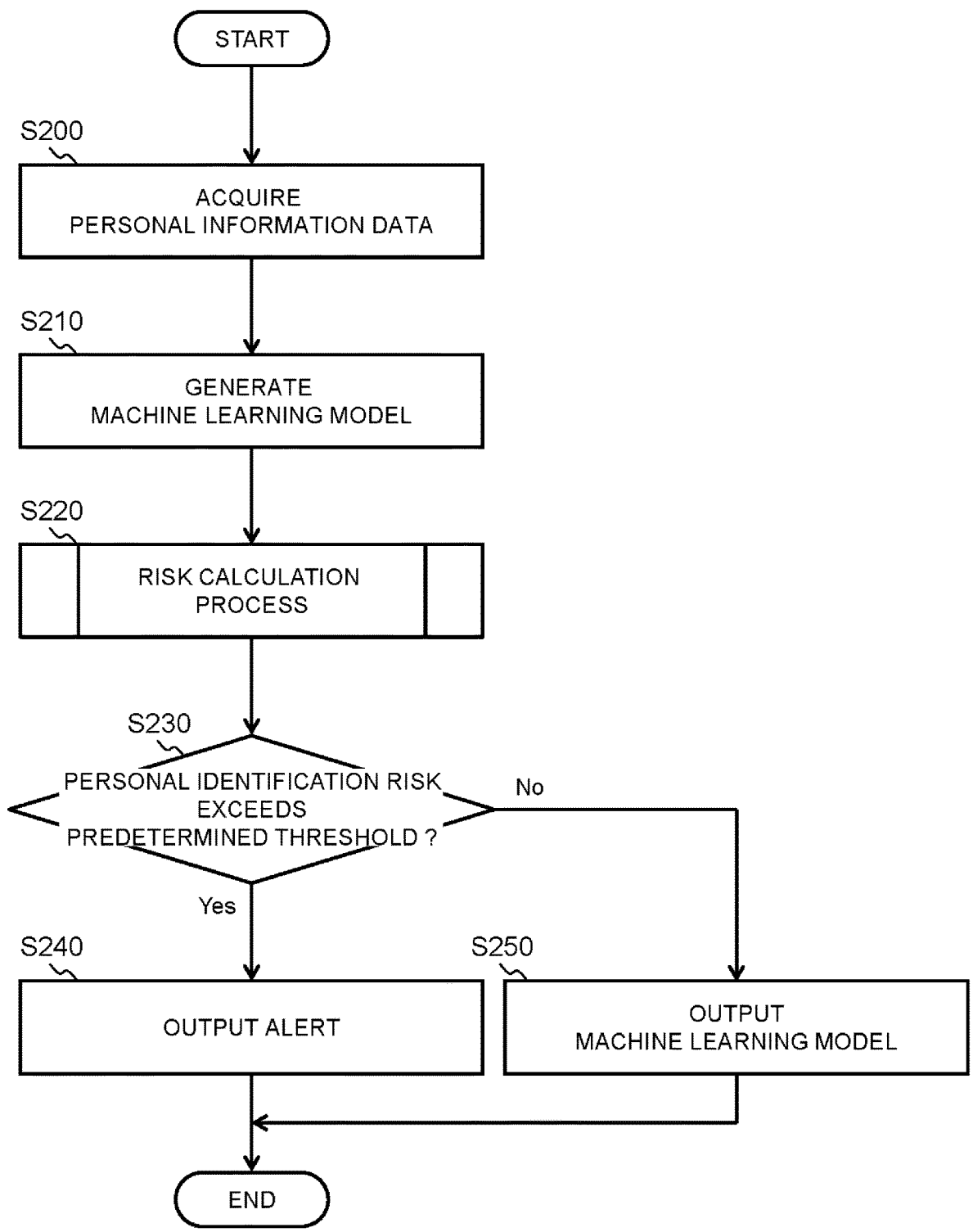
FIG. 7 is a flowchart showing a machine learning model generating method realized by the machine learning model generating system according to an embodiment, of the present disclosure.

FIG. 7 is a flowchart showing the machine learning model generating method realized by the machine learning model generating system 10 according to the present embodiment. The flowchart shown in FIG. 7 starts when the processing apparatus 100 acquires the request information for the machine learning model, and the processing is executed at predetermined intervals.

In Step S200, the model generation processing unit 120 executes acquiring personal information data corresponding to the metadata and the first data range designated, by the request information. Then the processing proceeds to Step S210.

In Step S210, the model generation processing unit 120 executes generating a machine learning model according to the machine learning logic designated by the request information, based on the personal information data acquired in Step S200. Then the processing proceeds to Step S220.

In Step S220, the risk calculation processing, unit 130 executes the risk calculation process and calculates the personal identification risk of the machine learning model generated in Step S210. Details of the risk calculation process will be described later. Then the processing proceeds to Step S230.

In Step S230, the output management processing unit 140 executes determining whether or not the personal identification risk calculated in Step S220 exceeds the predetermined threshold. When the personal identification risk exceeds the predetermined threshold (Step S230; Yes), the processing proceeds to Step S240. When the personal identification risk does not exceed the predetermined threshold (Step S230; No), the processing proceeds to Step S250.

In Step S240, the output management processing unit 140 outputs the alerts. On the other hand, the output management processing unit 140 does not output the machine learning, model generated in Step S210. After Step S240, the processing ends.

In Step S250, the output management processing unit 140 outputs the machine learning model generated in Step S210. After Step S250, the processing ends.

As described above, in the machine learning model providing process, the generated machine learning model is not outputted when the personal identification risk exceeds the predetermined threshold. It is thus possible to suppress providing a machine learning model where the output could identify an individual and privacy protection is insufficient.

3. Risk Calculation Process

The following will describe the risk calculation process executed by the risk calculation processing unit 130.

First, the risk calculation processing unit 130 executes selecting the input data for the machine learning model generated by the model generation processing unit 120. The input data is selected from the collection of personal information data 210.

Here, the risk calculation processing unit 130 executes generating a second data range determining a part of the collection, of personal information data 210, and selecting personal information data corresponding to the second data range as the input data. The subject of the second data, range is equivalent to the first data range because the second data range, is used to select the input data of the generated machine learning model. For example, if the first data range is related to the time period regarding the time when the data, is acquired, then the second data range is similarly related to the time period regarding the time when the data is acquired. Incidentally, note that the personal information data, selected as the input data corresponds to the metadata designated by the request information.

Typically, the second data range is generated so that it does not overlap with the first data range. This is to prevent duplication of the data selected by the second data, range with the data used for learning, validation, and evaluation.

Furthermore, the second data range may comprise a plurality of data ranges each of which is generated in different scale. For example, when the second data range is related to the time period regarding the time when the data is acquired, the second data range may include a plurality of data ranges in different time scale (e.g, in minutes, in hours, in days, and in months).

It is thus possible to acquire a plurality of the output data of the generated machine learning model for the plurality of input data each of which is generated in different scale. Consequently, it is possible to reduce that the personal identification risk is calculated too small due to improper scale.

Next, the risk calculation processing unit 130 executes acquiring the output data of the generated machine, learning model by inputting the input data. Here, when the request information includes the logic to convert the data to training data, the risk calculation processing unit 130 may appropriately execute converting the data acquired from the memory 200 to the input data.

Next, the risk calculation processing unit 130 executes generating correspondence information which shows correspondence between the one or more pieces of ID information corresponded to the input data and the output data for the input data. The following will describe the correspondence information with reference to FIG. 8A and FIG. 8B. FIG. 8A shows an example of the input data, and the output data for the input data. FIG. 8B shows the generated correspondence information for the input data and the output data shown in FIG. 8A.

The correspondence information shown in FIG. 8B shows the correspondence between the ID information and the set of the output data for each of the three pieces of ID information (jfda093jt, gq409jf32, 65k262f). Here, the set of the output data consists of output data for the input data corresponding to the ID information. From the correspondence information shown in FIG. 8B, it can be seen that the output data of "4" is particularly biased when the ID information is "jfda093jt". That is, the output data of "4" may represent a particular person whose ID information is "jfda093jt". Then, it is likely that the output data could identify an individual. As described above, the correspondence information provides information regarding the personal identification risk.

The risk calculation processing unit 130 calculates the personal identification risk based on the correspondence information. Calculating the personal identification risk based on the correspondence information is performed as follows, for example.

First, the risk calculation processing unit 130 executes classifying the output data into categories. The categories may be appropriately defined according to the content of the output data.

For example, when the output data is one-dimensional continuous values, determine the number of the categories by the Sturges' formula, and give a histogram by determining bins from the number of the categories and the maximum and minimum values of the output data. Then, define the bins in the histogram as the categories.

As another example, when the output data is image data, define a distance between two image data and classify each, output data into a certain number of groups based on the distance by performing the Agglomerative Hierarchical Clustering. Then, define the groups as the categories.

As another example, when the output data is discrete values or labels, define the discrete values or labels as the categories.

Next, the risk calculation processing unit 130 executes calculating, for each of combinations of the one or more pieces of ID information and the categories, number of the output data which falls into a category specified by a combination and corresponds in the correspondence information to ID information specified by the combination.

FIG. 9 shows the number of the output data calculated for each of combinations of the one or more pieces of ID information and the categories when the correspondence information is generated as shown in FIG. 8B. Here, (i, j) is one of the combinations, "i" shows the ID information and "j" shows the category. And u(i, j) is the number or the output data calculated regarding (i, j). In FIG. 9, the value of each output data is regarded as the category.

Then, the risk calculation processing unit 130 executes calculating the personal identification risk according to the following formula, where IR is the personal identification risk and k is given to through the entire combination of i or j.

$$r(i, j) = \frac{u(i, j)}{\sum_k u(i, k) + \sum_k u(k, j) - u(i, j)}$$

$$IR = \max_{(i,j)}(r(i, j))$$

FIG. 10A shows an example of u (i, j) calculated for ascertain confidence information. And FIG. 10B shows r (i, j) calculated according to the above formula for u (i, j) shown in FIG. 10A. The case shown in FIG. 10A and FIG. 10B, the personal identification risk calculated according to the above formula is 4/5 (the largest value of r(i, j) shown in FIG. 10B).

When the second data range comprises the plurality of data ranges (for example, when the second data range comprises the plurality of data ranges each of which is generated in different scale), the risk calculation processing unit 130 may be configured to execute calculating IR according to the above formula for each of the plurality of data range. Then, the risk calculation processing unit 130 may be configured to execute calculating the personal identification risk by taking weighted arithmetic mean for the calculated IR. Here, the weights may be defined based on the number of ID information included in each data range.

Figure 11:
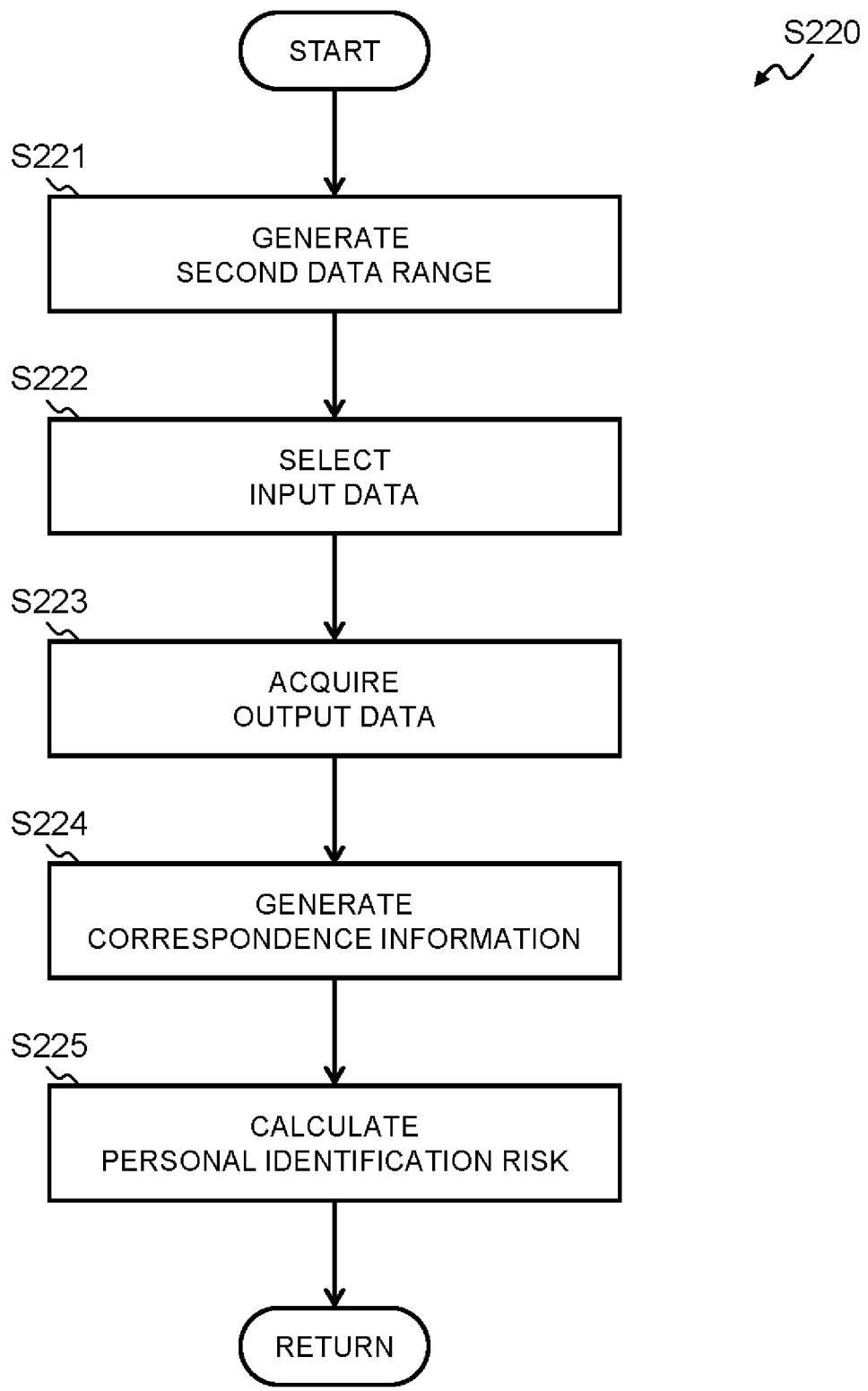
FIG. 11 is a flowchart showing processing to calculate the personal identification risk.

FIG. 11 is a flowchart showing processing executed by the risk calculation processing unit 130 (Step S220 in FIG. 7).

In Step S221, the risk calculation processing, unit 130 executes generating the second data range. Then the processing proceeds to Step S222.

In Step S222, the risk calculation processing unit 130 executes selecting the personal information data corresponding to the second data range generated in Step S221 as the input data. Then the processing proceeds to Step S223.

In Step S223, the risk calculation processing unit 130 executes acquiring the output data of the generated machine learning model by inputting the input data selected in Step S222. Then the processing proceeds to Step S224.

In Step S224, the risk calculation processing unit 130 executes generating the correspondence information based on the output data acquired in Step S223. Then the processing proceeds to Step S225.

In Step S225, the risk calculation processing, unit 130 executes calculating the personal identification risk based on the correspondence information generated in Step S224. After Step S225, the processing ends.

4. Feedback to User

The output management processing unit 140 may be configured to execute providing feedback to user 3 while outputting the alerts, when the personal identification risk exceeds the predetermined threshold. The following will describe examples of the feedback.

One example of the feedback is related to the category in which r(i, j) is equal to or greater than a threshold. Considering the example shown in FIG. 10, when the threshold is 0.5, the combination of the ID of #3 and the category of #3 is greater than the threshold. Therefore, the category of #3 is provided to the user 3 as the feedback. This ease can be expected to be resolved by changing labels or categories of the output data. For this reason, recommendation changing labels or categories may be further provided to the user 3 as the feedback.

Another example of the feedback is related to the existence of an individual (ID information) that are concentrated in a single category. In the example shown in FIG. 10, the combination of the ID of #4 and the category of #2 is applicable to this case. This case can be expected to be resolved by expanding the first data range. For this reason, recommendation expanding the first data range may be provided to the user 3 as the feedback.

5. Effect

As described above, according to the present embodiment, the machine learning model using personal information data is generated. And, when the personal identification risk exceeds the predetermined threshold, the generated machine learning model is not provided. It is thus possible to suppress providing a machine learning model where the output, could identify an individual and privacy protection is insufficient. Consequently, it is possible to reduce the risk of leaks of personal information data.

In addition, personal information data, corresponding to the designated metadata and the first data range is used to generate the machine learning model. Therefore, it is not necessary to disclose the personal information data to the user 3. Consequently, it is possible to provide a machine learning model generated by directly using personal information data, not statistical information.

Furthermore, the second data range may comprise a plurality of data ranges each of which is generated in different scale. Consequently, it is possible to reduce that the personal identification risk is calculated too small due to improper scale.

What is claimed is:
1. A system comprising:
 a memory that storing a collection of personal information data and a data catalog of the collection of personal information data; and
 a processing apparatus configured to execute:
  acquiring designation of metadata in the data catalog;
  acquiring a first data range determining a part of the collection of personal information data;
  acquiring a machine learning logic;

generating a machine learning model according to the machine learning logic, based on personal information data corresponding to designated metadata and the first data range;

calculating a personal identification risk which shows a risk of a person being identified based on an output of the machine learning model; and outputting the machine learning model when the personal identification risk does not exceed a predetermined threshold;

wherein each of the collection of personal information data is corresponding to one or more pieces of ID information each of which shows a particular individual, and the calculating the personal identification risk includes:

selecting input data from the collection of personal information data;

acquiring output data of the machine learning model by inputting the input data;

generating correspondence information which shows correspondence between the one or more pieces of ID information corresponded to the input data and the output data for the input data; and calculating the personal identification risk based on the correspondence information;

the calculating the personal identification risk further includes:

classifying the output data into categories;

calculating, for each of combinations of the one or more pieces of ID information and the categories, number of the output data which falls into a category specified by a combination and corresponds in the correspondence information to ID information specified by the combination; and calculating the personal identification risk according to the following formula:

$$r(i, j) = \frac{u(i, j)}{\sum_k u(i, k) + \sum_k u(k, j) - u(i, j)}$$

$$IR = \max_{(i,j)}(r(i, j))$$

where:

IR is the personal identification risk, (i, j) is one of the combinations, and u (i, j) is the number of the output data calculated regarding (i, j).

2. The system according to claim 1, wherein the selecting the input data includes:

generating a second data range determining a part of the collection of personal information data; and selecting personal information data corresponding to the second data range as the input data.

3. The system according to claim 2, wherein the second data range comprises a plurality of data ranges each of which is generated in different scale.

4. A method comprising:

storing a collection of personal information data and a data catalog of the collection of personal information data into a memory; and causing a processing apparatus to execute:

acquiring designation of metadata in the data catalog;

acquiring a first data range determining a part of the collection of personal information data;

acquiring a machine learning logic;

generating a machine learning model according to the machine learning logic, based on personal information data corresponding to designated metadata and the first data range;

calculating a personal identification risk which shows a risk of a person being identified based on an output of the machine learning model; and outputting the machine learning model when the personal identification risk does not exceed a predetermined threshold, and not outputting the machine learning model when the personal identification risk exceeds the predetermined threshold;

wherein each of the collection of personal information data is corresponding to one or more pieces of ID information each of which shows a particular individual, and the calculating the personal identification risk includes:

selecting input data from the collection of personal information data;

acquiring output data of the machine learning model by inputting the input data;

generating correspondence information which shows correspondence between the one or more pieces of ID information corresponded to the input data and the output data for the input data; and calculating the personal identification risk based on the correspondence information;

the calculating the personal identification risk further includes:

classifying the output data into categories;

calculating, for each of combinations of the one or more pieces of ID information and the categories, number of the output data which falls into a category specified by a combination and corresponds in the correspondence information to ID information specified by the combination; and calculating the personal identification risk according to the following formula:

$$r(i, j) = \frac{u(i, j)}{\sum_k u(i, k) + \sum_k u(k, j) - u(i, j)}$$

$$IR = \max_{(i,j)}(r(i, j))$$

where:

IR is the personal identification risk, (i, j) is one of the combinations, and u(i, j) is the number of the output data calculated regarding (i, j).

* * * * *